(12) United States Patent
Lee et al.

(10) Patent No.: US 11,413,967 B2
(45) Date of Patent: Aug. 16, 2022

(54) CONTACTLESS DRIVING MODULE AND TRANSFER APPARATUS HAVING THE SAME

(71) Applicant: SEMES CO., LTD., Cheonan-si (KR)

(72) Inventors: Sung Hyun Lee, Anyang-si (KR); Jung Hun Lee, Cheonan-si (KR); Dong Won Shin, Hwaseong-si (KR)

(73) Assignee: SEMES CO., LTD., Cheonan-si (KR)

( * ) Notice: Subject to any disclaimer, the term of this patent is extended or adjusted under 35 U.S.C. 154(b) by 140 days.

(21) Appl. No.: 16/933,435

(22) Filed: Jul. 20, 2020

(65) Prior Publication Data

US 2020/0346548 A1 Nov. 5, 2020

Related U.S. Application Data

(62) Division of application No. 15/689,339, filed on Aug. 29, 2017, now Pat. No. 10,744,886.

(30) Foreign Application Priority Data

Aug. 30, 2016 (KR) .......................... 10-2016-0110669

(51) Int. Cl.
*B60L 13/04* (2006.01)
*B61B 13/12* (2006.01)
*B61B 13/08* (2006.01)

(52) U.S. Cl.
CPC .............. *B60L 13/04* (2013.01); *B61B 13/08* (2013.01); *B61B 13/125* (2013.01); *B60L 2200/26* (2013.01)

(58) Field of Classification Search
CPC .......... B60L 13/04; B60L 13/06; B60L 13/08; B60L 13/10; B60L 13/006; B60L 13/00;
(Continued)

(56) References Cited

U.S. PATENT DOCUMENTS 4,356,772 A * 11/1982 van der Heide ...... H01J 35/103
104/282
5,277,125 A * 1/1994 DiFonso ............... B60L 13/006
104/294

(Continued)

FOREIGN PATENT DOCUMENTS

WO WO-2016082155 A1 * 6/2016 .............. B60L 13/04

*Primary Examiner* — Mark T Le
(74) *Attorney, Agent, or Firm* — Kile Park Reed & Houtteman PLLC

(57) ABSTRACT

A transfer apparatus includes a guide rails extending parallel with each other, a vehicle configured to be movable along the guide rails, and a contactless driving module mounted to the vehicle. The contactless driving module includes a pair of running rails extending parallel with the guide rails and comprising a plurality of first permanent magnets and a plurality of second permanent magnets arranged in a extending direction, respectively, a driving wheel disposed between the running rails to be spaced apart from the running rails and comprising a plurality of third permanent magnets arranged in a circumferential direction, and a driving unit for rotating the driving wheel. Particularly, at least one of the third permanent magnets is disposed between the first permanent magnets and the second permanent magnets.

12 Claims, 13 Drawing Sheets

(58) Field of Classification Search
CPC .... B60L 13/03; B60L 13/035; B60L 2200/26; B61B 13/08; B61B 13/125; E01B 25/30; E01B 25/32; E01B 25/305
See application file for complete search history.

(56) References Cited

U.S. PATENT DOCUMENTS

| | | | | |
|---|---|---|---|---|
| 6,659,237 | B1* | 12/2003 | Pribonic | B60L 7/28 |
| | | | | 188/165 |
| 7,265,470 | B1* | 9/2007 | Paden | H02K 49/106 |
| | | | | 310/156.43 |
| 7,965,010 | B2* | 6/2011 | Froeschle | H02K 41/031 |
| | | | | 310/156.43 |
| 9,325,232 | B1* | 4/2016 | Hunstable | H02K 35/04 |
| 9,371,856 | B2* | 6/2016 | Kundel | F16C 32/0423 |
| 10,381,911 | B2* | 8/2019 | Usui | H02K 41/031 |

* cited by examiner

CONTACTLESS DRIVING MODULE AND TRANSFER APPARATUS HAVING THE SAME

CROSS-REFERENCE TO RELATED APPLICATION

This application is a divisional application of U.S. patent application Ser. No. 15/689,339, filed on Aug. 29, 2017, the disclosure of which is herein incorporated by reference in its entirety. The U.S. patent application Ser. No. 15/689,339 claims priority to Korean Application No. 10-2016-0110669, filed on Aug. 30, 2016, the entire all the benefits accruing therefrom under 35 U.S.C. § 119, the contents of which are incorporated by reference in their entirety.

BACKGROUND

The present disclosure relates to a contactless driving module and a transfer apparatus having the same. More specifically, the present disclosure relates to a contactless driving module configured to be movable in a contactless manner using a magnetic force between permanent magnets and a transfer apparatus having the same.

A storage container for storing semiconductor wafers, such as a FOUP (Front Opening Unified Pod) and a FOSB (Front Opening Shipping Box), may be transferred by a transfer apparatus such as an OHT (Overhead Hoist Transport) and a RGV (Rail Guided Vehicle) in a semiconductor manufacturing process.

The transfer apparatus may be moved along running rails disposed on the ceiling or floor of the clean room and include a plurality of running wheels and a driving unit for rotating the running wheels. In recent years, as the degree of integration of semiconductor devices increases, it is necessary to maintain a high degree of cleanliness in the clean room. Thus, particles generated by friction between the running rails and the running wheels are attracting attention as a main object for maintenance of cleanliness of the clean room.

SUMMARY

The present disclosure provides a contactless driving module capable of reducing particles and a transfer apparatus including the contactless driving module.

In accordance with an aspect of the present disclosure, a contactless driving module may include a pair of running rails extending parallel with each other and including a plurality of first permanent magnets and a plurality of second permanent magnets arranged in an extending direction, respectively, a driving wheel disposed between the running rails to be spaced apart from the running rails and including a plurality of third permanent magnets arranged in a circumferential direction, and a driving unit for rotating the driving wheel. Here, at least one of the third permanent magnets may be disposed between the first permanent magnets and the second permanent magnets.

In accordance with some exemplary embodiments, the first and second permanent magnets may be disposed such that N poles and S poles are arranged in the extending direction and poles of the same polarities face each other in the extending direction.

In accordance with some exemplary embodiments, the first and second permanent magnets may be disposed such that N poles and S poles are arranged in a second direction perpendicular to the extending direction and polarities change in the extending direction.

In accordance with some exemplary embodiments, the first and second permanent magnets may be arranged in a Halbach arrangement.

In accordance with some exemplary embodiments, N poles and S poles of the first permanent magnets may be arranged so as to face N poles and S poles of the second permanent magnets in the second direction, respectively.

In accordance with some exemplary embodiments, N poles and S poles of the first permanent magnets may be arranged so as to face S poles and N poles of the second permanent magnets in the second direction, respectively.

In accordance with some exemplary embodiments, the third permanent magnets may be arranged in a Halbach arrangement.

In accordance with some exemplary embodiments, the driving wheel may further include a plurality of fourth permanent magnets circumferentially arranged in a Halbach arrangement, and the third and fourth permanent magnets may be disposed on both sides of the driving wheel so as to face the first and second permanent magnets, respectively.

In accordance with some exemplary embodiments, the third permanent magnets may be disposed such that N poles and S poles are arranged in the circumferential direction and poles of the same polarities face each other in the circumferential direction.

In accordance with some exemplary embodiments, the third permanent magnets may be disposed such that N poles and S poles are arranged in the second direction and polarities change in the circumferential direction.

In accordance with some exemplary embodiments, the driving wheel may further include a plurality of fourth permanent magnets arranged in the circumferential direction, the fourth permanent magnets may be disposed such that N poles and S poles are arranged in the second direction and polarities change in the circumferential direction, and the third and fourth permanent magnets may be disposed on both sides of the driving wheel so as to face the first and second permanent magnets, respectively.

In accordance with some exemplary embodiments, a pitch of the first and second permanent magnets in the extending direction may be the same as a pitch of the third permanent magnets in the circumferential direction.

In accordance with another aspect of the present disclosure, a transfer apparatus may include a pair of guide rails extending parallel with each other, a vehicle configured to be movable along the guide rails, and a contactless driving module mounted to the vehicle. The contactless driving module may include a pair of running rails extending parallel with the guide rails and comprising a plurality of first permanent magnets and a plurality of second permanent magnets arranged in an extending direction, respectively, a driving wheel disposed between the running rails to be spaced apart from the running rails and comprising a plurality of third permanent magnets arranged in a circumferential direction, and a driving unit for rotating the driving wheel. Here, at least one of the third permanent magnets may be disposed between the first permanent magnets and the second permanent magnets.

In accordance with some exemplary embodiments, the transfer apparatus may further include a magnetic levitation unit for levitating the vehicle from the guide rails.

In accordance with some exemplary embodiments, the vehicle may include guide frames surrounding the guide rails, respectively, and the magnetic levitation unit may include magnetic levitation coils mounted to the guide frames so as to face lower portions of the guide rails.

In accordance with some exemplary embodiments, first and second guide magnets which generate a repulsive force therebetween may be disposed on side surfaces of the guide frames and the guide rails facing each other, respectively.

In accordance with some exemplary embodiments, at least one of the first and second guide magnets may be an electromagnet.

In accordance with some exemplary embodiments, the vehicle may include auxiliary wheels mounted to the guide frames so as to face upper portions of the guide rails.

In accordance with some exemplary embodiments, the vehicle may include running wheels disposed on upper portions of the guide rails.

In accordance with some exemplary embodiments, the vehicle may include guide wheels disposed on side portions of the guide rails.

In accordance with some exemplary embodiments, a hoist module may be mounted to a lower portion of the vehicle.

In accordance with some exemplary embodiments, the transfer apparatus may further include a support rail for supporting the guide rails and the running rails.

The above summary of the present disclosure is not intended to describe each illustrated embodiment or every implementation of the present disclosure. The detailed description and claims that follow more particularly exemplify these embodiments.

BRIEF DESCRIPTION OF THE DRAWINGS

Exemplary embodiments can be understood in more detail from the following description taken in conjunction with the accompanying drawings, in which.

Figure 1:
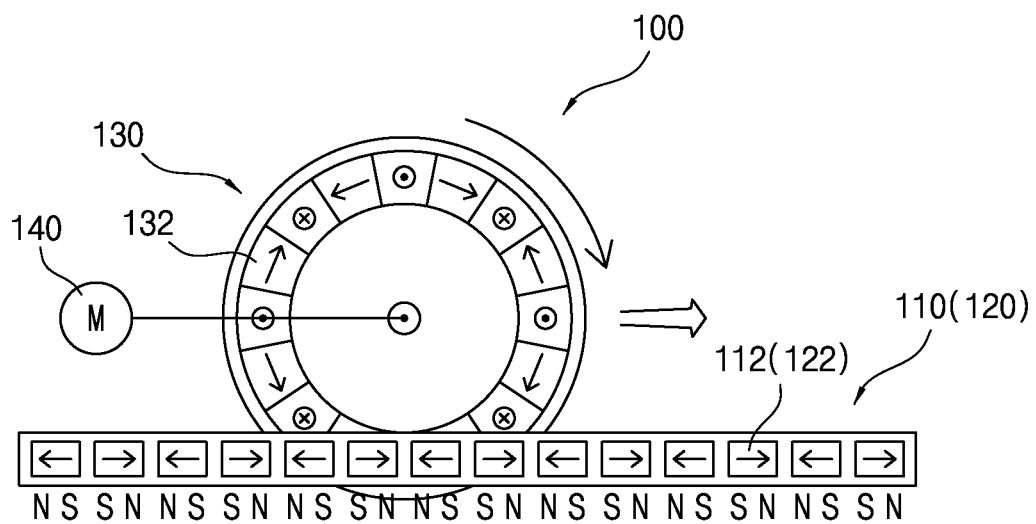
FIG. 1 is a schematic view illustrating a contactless driving module in accordance with an exemplary embodiment of the present disclosure.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Hereinafter, embodiments of the present invention are described in more detail with reference to the accompanying drawings. However, the present invention is not limited to the embodiments described below and is implemented in various other forms. Embodiments below are not provided to fully complete the present invention but rather are provided to fully convey the range of the present invention to those skilled in the art.

In the specification, when one component is referred to as being on or connected to another component or layer, it can be directly on or connected to the other component or layer, or an intervening component or layer may also be present. Unlike this, it will be understood that when one component is referred to as directly being on or directly connected to another component or layer, it means that no intervening component is present. Also, though terms like a first, a second, and a third are used to describe various regions and layers in various embodiments of the present invention, the regions and the layers are not limited to these terms.

Terminologies used below are used to merely describe specific embodiments, but do not limit the present invention. Additionally, unless otherwise defined here, all the terms including technical or scientific terms, may have the same meaning that is generally understood by those skilled in the art.

Embodiments of the present invention are described with reference to schematic drawings of ideal embodiments. Accordingly, changes in manufacturing methods and/or allowable errors may be expected from the forms of the drawings. Accordingly, embodiments of the present invention are not described being limited to the specific forms or areas in the drawings, and include the deviations of the forms. The areas may be entirely schematic, and their forms may not describe or depict accurate forms or structures in any given area, and are not intended to limit the scope of the present invention.

Figure 2:
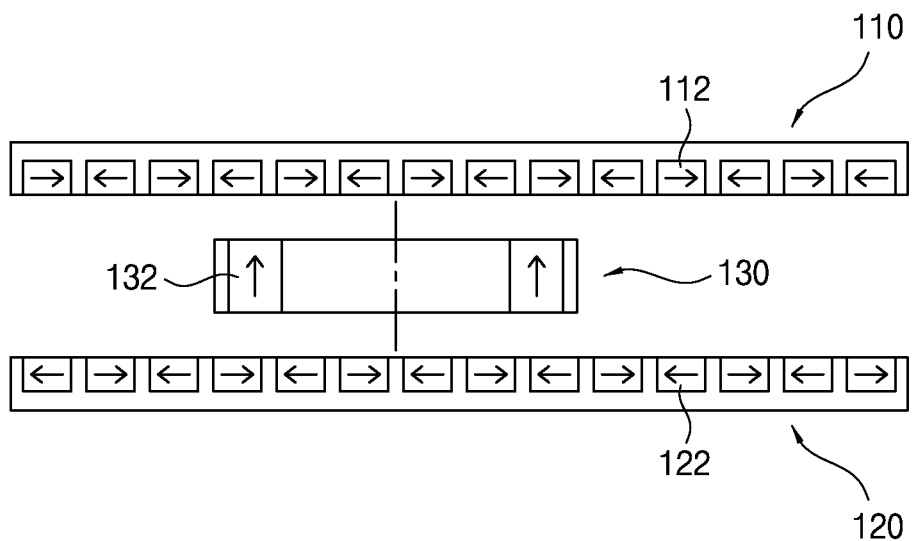
FIG. 2 is a cross-sectional view illustrating running rails and a driving wheel as shown in FIG. 1.

FIG. 1 is a schematic view illustrating a contactless driving module in accordance with an exemplary embodiment of the present disclosure, and FIG. 2 is a cross-sectional view illustrating running rails and a driving wheel as shown in FIG. 1.

Referring to FIGS. 1 and 2, a contactless driving module 100 may generate propulsive force in a contactless manner and may thus reduce particles in comparison with a conventional traveling module that generates propulsive force using friction. Particularly, the contactless driving module may be used to transport objects in a clean room.

In accordance with an exemplary embodiment of the present disclosure, the contactless driving module 100 may include a pair of running rails extending parallel with each other, for example, first and second running rails 110 and 120, a driving wheel 130 disposed between the first and second running rails 110 and 120, and a driving unit 140 for rotating the driving wheel 130. The first and second running rails 110 and 120 may include a plurality of first permanent magnets 112 and a plurality of second permanent magnets 122 arranged in an extending direction, respectively, and the driving wheel 130 may include a plurality of third permanent magnets 132 arranged in a circumferential direction.

The driving unit 140 may rotate the driving wheel 130 such that the driving wheel 130 is moved along the running rails 110 and 120. For example, the driving unit 140 may include a motor, and a propulsive force may be generated by magnetic force among the first, second and third permanent magnets 112, 122 and 132, and rotational force provided by the driving unit 140.

The driving wheel 130 may be disposed to be spaced apart from the first and second running rails 110 and 120. Particularly, at least a portion of the third permanent magnets 132 may be disposed between the first and second permanent magnets 112 and 122, as shown in FIG. 1, such that the driving wheel 130 is moved along the running rails 110 and 120. As a result, the driving wheel 130 may be moved without contact between the first and second running rails 110 and 120 and the driving wheel 130.

The first and second permanent magnets 112 and 122 may be disposed such that N poles and S poles are arranged in the extending direction and poles of the same polarities face each other in the extending direction as shown in FIG. 2. The third permanent magnets 132 may be arranged in a Halbach arrangement as shown in FIG. 1.

Figure 3:
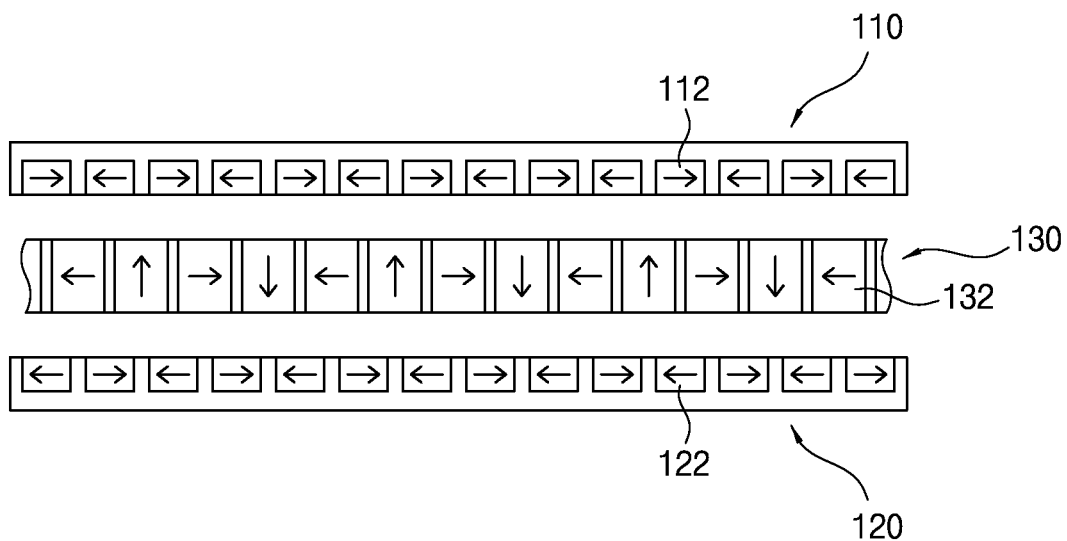
FIG. 3 is a development view illustrating the driving wheel as shown in FIG. 1.

FIG. 3 is a development view illustrating the driving wheel as shown in FIG. 1.

Referring to FIGS. 1 and 3, some of the third permanent magnets 132 may be disposed such that N poles and S poles are arranged in the circumferential direction, and the remainder may be disposed such that N poles and S poles are arranged in a second direction perpendicular to the extending direction. Further, the third permanent magnets 132 may be disposed such that polarities change in the circumferential direction.

A pitch of the first and second permanent magnets 112 and 122 in the extending direction may be configured to be the same as a pitch of the third permanent magnets 132 in the circumferential direction so as to increase the magnetic force between the first and second permanent magnets 112 and 122 and the third permanent magnets 132. Further, N poles and S poles of the first permanent magnets 112 may be arranged so as to face S poles and N poles of the second permanent magnets 122 in the second direction perpendicular to the extending direction.

Figure 4:
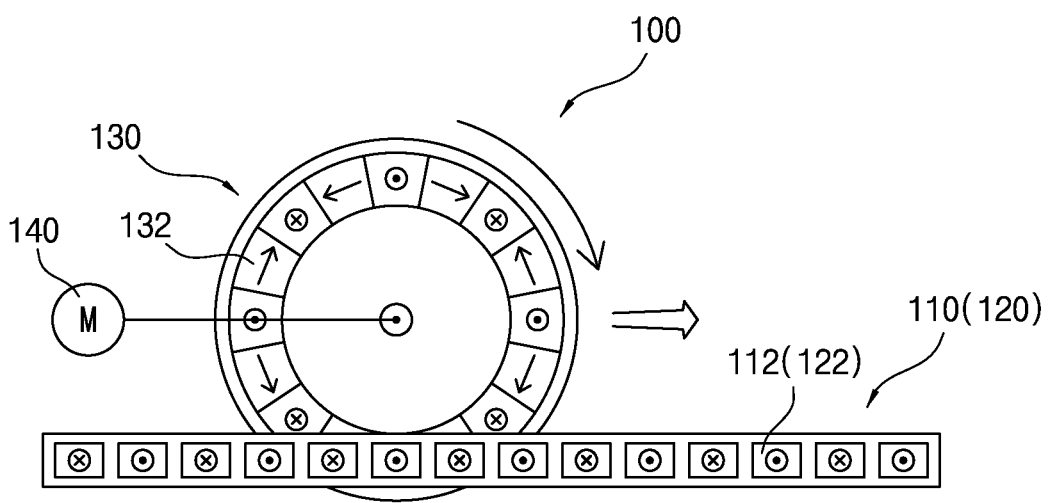
FIG. 4 is a schematic view illustrating a contactless driving module in accordance with another exemplary embodiment of the present disclosure.
Figure 5:
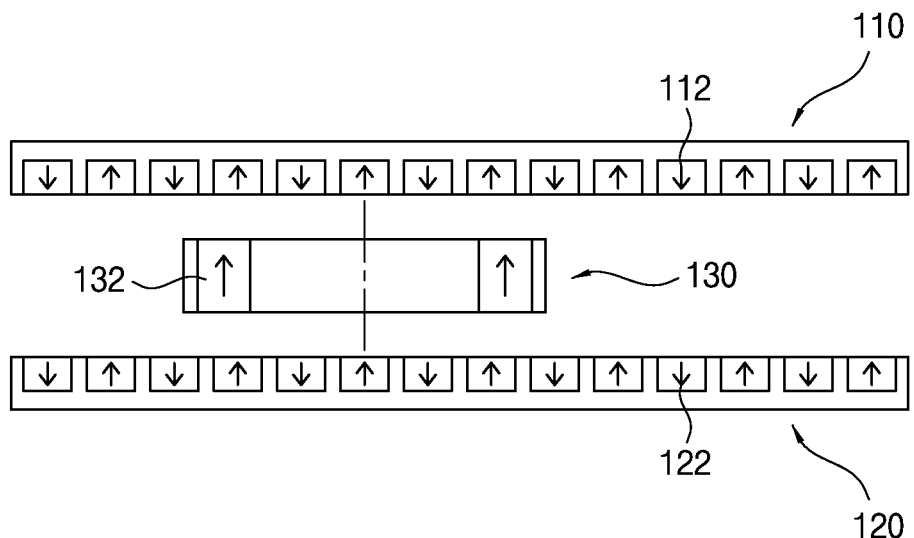
FIG. 5 is a cross-section view illustrating running rails and a driving wheel as shown in FIG. 4.

FIG. 4 is a schematic view illustrating a contactless driving module in accordance with another exemplary embodiment of the present disclosure, and FIG. 5 is a cross-section view illustrating running rails and a driving wheel as shown in FIG. 4.

Referring to FIGS. 4 and 5, first and second permanent magnets 112 and 122 may be disposed such that N poles and S poles are arranged in a second direction perpendicular to an extending direction of first and second running rails 110 and 120 and polarities change in the extending direction. Here, third permanent magnets 132 of a driving wheel 130 may be circumferentially arranged in a Halbach arrangement.

A pitch of the first and second permanent magnets 112 and 122 in the extending direction may be configured to be the same as a pitch of the third permanent magnets 132 in the circumferential direction. Further, N poles and S poles of the first permanent magnets 112 may be arranged so as to face S poles and N poles of the second permanent magnets 122 in the second direction.

Figure 6:
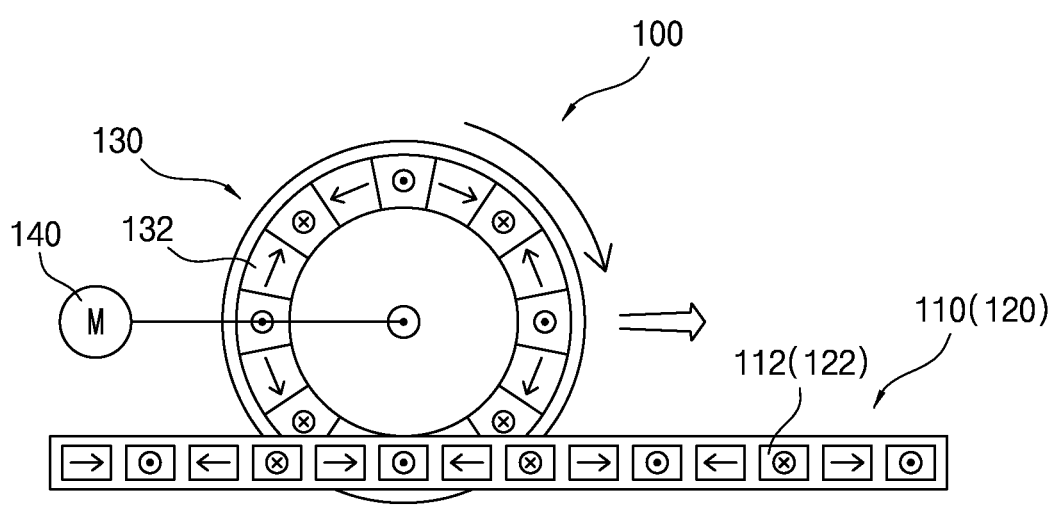
FIG. 6 is a schematic view illustrating a contactless driving module in accordance with still another exemplary embodiment of the present disclosure.
Figure 7:
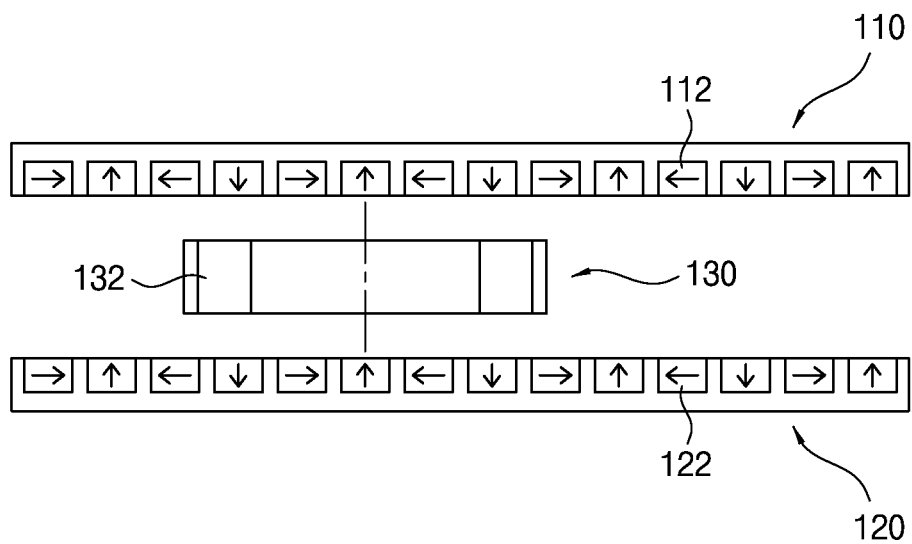
FIG. 7 is a cross-section view illustrating running rails and a driving wheel as shown in FIG. 6.
Figure 8:
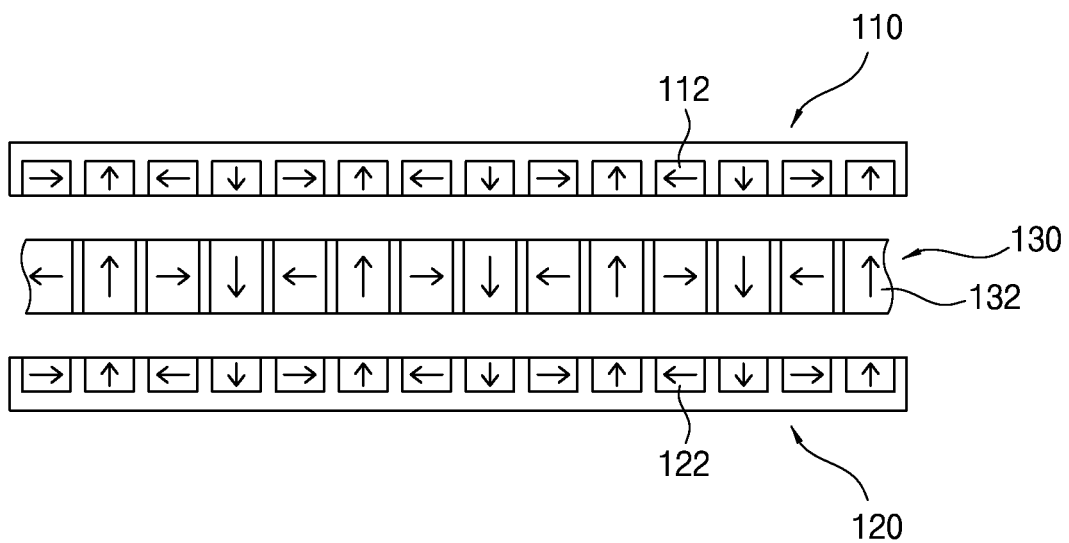
FIG. 8 is a development view illustrating the driving wheel as shown in FIG. 6.

FIG. 6 is a schematic view illustrating a contactless driving module in accordance with still another exemplary embodiment of the present disclosure, FIG. 7 is a cross-section view illustrating running rails and a driving wheel as shown in FIG. 6, and FIG. 8 is a development view illustrating the driving wheel as shown in FIG. 6.

Referring to FIGS. 6 to 8, first and second permanent magnets 112 and 122 of first and second running rails 110 and 120 may be arranged in a Halbach arrangement in an extending direction of the first and second running rails 110 and 120. Particularly, polarities of the first and second permanent magnets 112 and 122, which correspond to each other in a second direction perpendicular to the extending direction, may be arranged in the same directions as shown in FIG. 7. Here, third permanent magnets 132 of a driving wheel 130 may be circumferentially arranged in a Halbach arrangement.

A pitch of the first and second permanent magnets 112 and 122 in the extending direction may be configured to be the same as a pitch of the third permanent magnets 132 in the circumferential direction. Further, when the third permanent magnets 132 are unrolled in the extending direction, the first, second and third permanent magnets 112, 122 and 132 may be arranged such that attractive forces are generated between the first and third permanent magnets 112 and 132 and between the second and third permanent magnets 122 and 132 as shown in FIG. 8.

Figure 9:
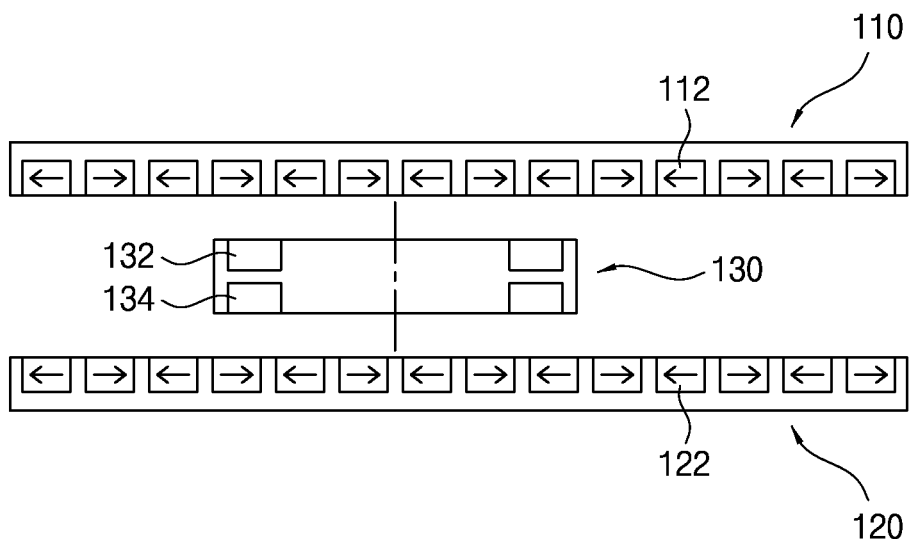
FIG. 9 is a cross-sectional view illustrating a contactless driving module in accordance with still another exemplary embodiment of the present disclosure.
Figure 10:
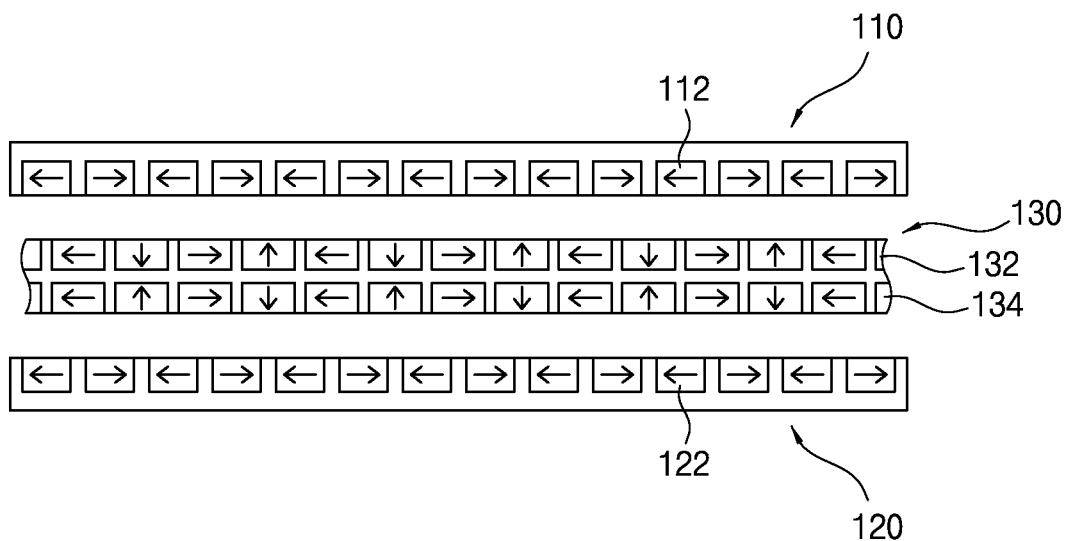
FIG. 10 is a development view illustrating a driving wheel as shown in FIG. 9.

FIG. 9 is a cross-sectional view illustrating a contactless driving module in accordance with still another exemplary embodiment of the present disclosure, and FIG. 10 is a development view illustrating a driving wheel as shown in FIG. 9.

Referring to FIGS. 9 and 10, first and second permanent magnets 112 and 122 of first and second running rails 110 and 120 may be disposed such that N poles and S poles are arranged in an extending direction of the first and second running rails 110 and 120 and poles of the same polarities face each other in the extending direction. Particularly, N poles and S poles of the first permanent magnets 112 may be arranged so as to face N poles and S poles of the second permanent magnets 122 in a second direction perpendicular to the extending direction as shown in FIG. 9.

A driving wheel 130 may be disposed between the first and second running rails 110 and 120, and may include a plurality of third permanent magnets 132 and a plurality of fourth permanent magnets 134 circumferentially arranged in a Halbach arrangement. For example, the third and fourth permanent magnets 132 and 134 may be disposed on both sides of the driving wheel 130 so as to face the first and second permanent magnets 112 and 122, respectively. Particularly, some of the third and fourth permanent magnets 132 and 134 may be disposed such that N poles and S poles are arranged in a circumferential direction, and the reminder may be disposed such that N poles and S poles are arranged in the second direction.

Further, a pitch of the first and second permanent magnets 112 and 122 in the extending direction may be configured to be the same as a pitch of the third and fourth permanent magnets 132 and 134 in the circumferential direction.

Figure 11:
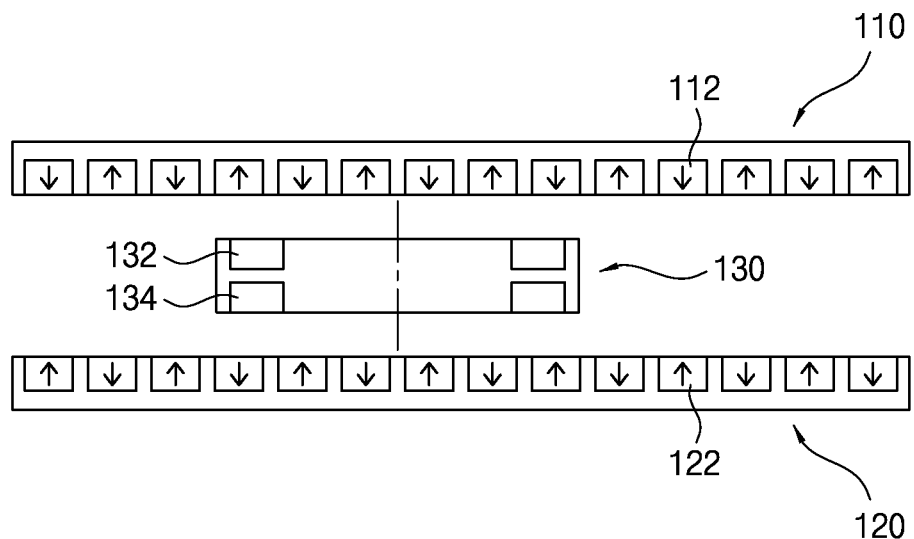
FIG. 11 is a cross-sectional view illustrating a contactless driving module in accordance with still another exemplary embodiment of the present disclosure.

FIG. 11 is a cross-sectional view illustrating a contactless driving module in accordance with still another exemplary embodiment of the present disclosure.

Referring to FIG. 11, first and second permanent magnets 112 and 122 may be disposed such that N poles and S poles are arranged in a second direction perpendicular to an extending direction of first and second running rails 110 and 120 and polarities change in the extending direction. Here, a driving wheel 130 may include a plurality of third permanent magnets 132 and a plurality of fourth permanent magnets 134 circumferentially arranged in a Halbach arrangement as shown in FIG. 10.

Further, a pitch of the first and second permanent magnets 112 and 122 in the extending direction may be configured to be the same as a pitch of the third and fourth permanent magnets 132 and 134 in the circumferential direction, and N poles and S poles of the first permanent magnets 112 may be arranged so as to face N poles and S poles of the second permanent magnets 122 in the second direction as shown in FIG. 11.

Figure 12:
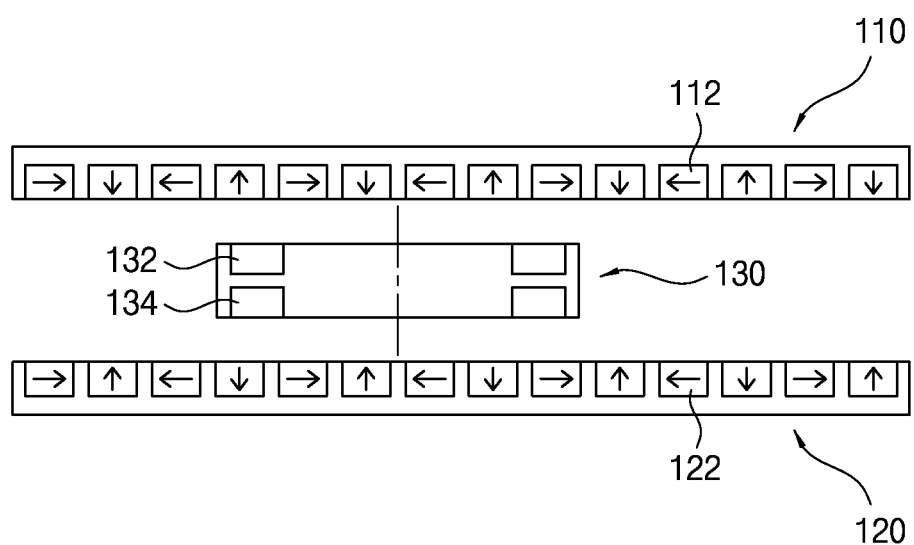
FIG. 12 is a cross-sectional view illustrating a contactless driving module in accordance with still another exemplary embodiment of the present disclosure.
Figure 13:
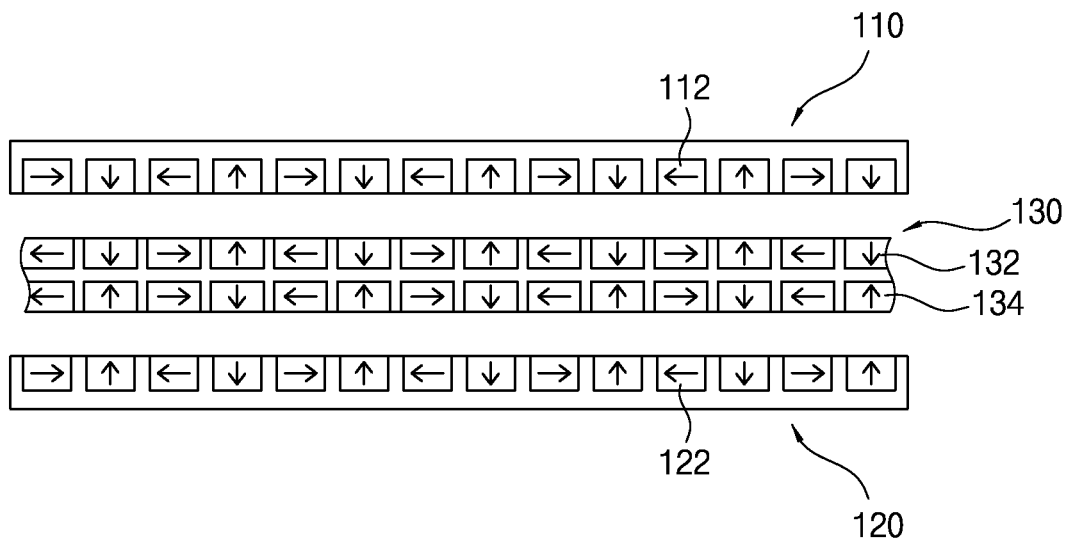
FIG. 13 is a development view illustrating a driving wheel as shown in FIG. 12.

FIG. 12 is a cross-sectional view illustrating a contactless driving module in accordance with still another exemplary embodiment of the present disclosure, and FIG. 13 is a development view illustrating a driving wheel as shown in FIG. 12.

Referring to FIGS. 12 and 13, first and second permanent magnets 112 and 122 may be arranged in a Halbach arrangement in an extending direction of first and second running rails 110 and 120. Particularly, the first and second permanent magnets 112 and 122 may be disposed such that magnetic poles of the same polarities face each other in a second direction perpendicular to the extending direction.

Further, third and fourth permanent magnets 132 and 134 may be arranged in a Halbach arrangement in a circumferential direction of a driving wheel 130. For example, the third and fourth permanent magnets 132 and 134 may be disposed on both sides of the driving wheel 130 so as to face the first and second permanent magnets 112 and 122, respectively.

Particularly, some of the third and fourth permanent magnets 132 and 134 may be disposed such that N poles and S poles are arranged in the circumferential direction, and the reminder may be disposed such that N poles and S poles are arranged in the second direction. Further, a pitch of the first and second permanent magnets 112 and 122 in the extending direction may be configured to be the same as a pitch of the third and fourth permanent magnets 132 and 134 in the circumferential direction.

Figure 14:
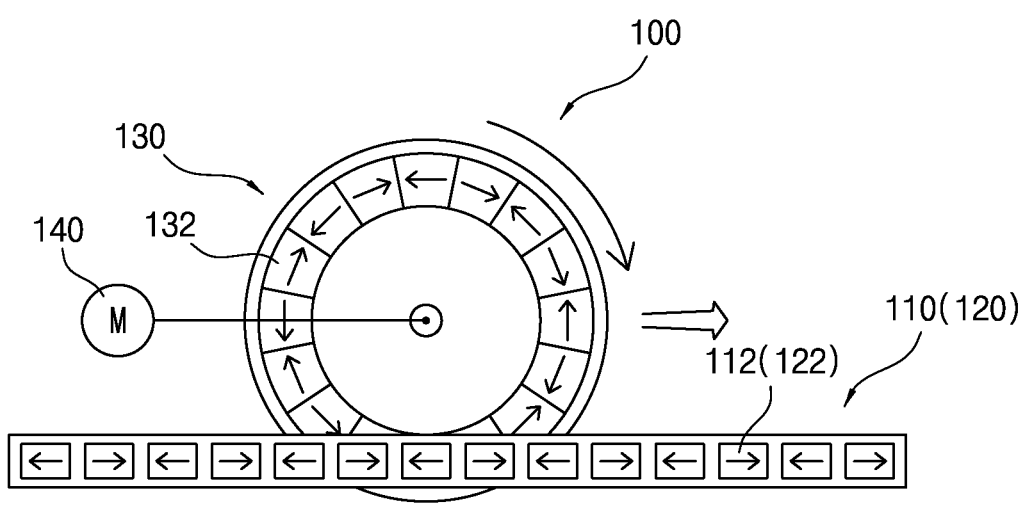
FIGS. 14, 15 and 16 are schematic views illustrating contactless driving modules in accordance with some exemplary embodiments of the present disclosure.
Figure 15:
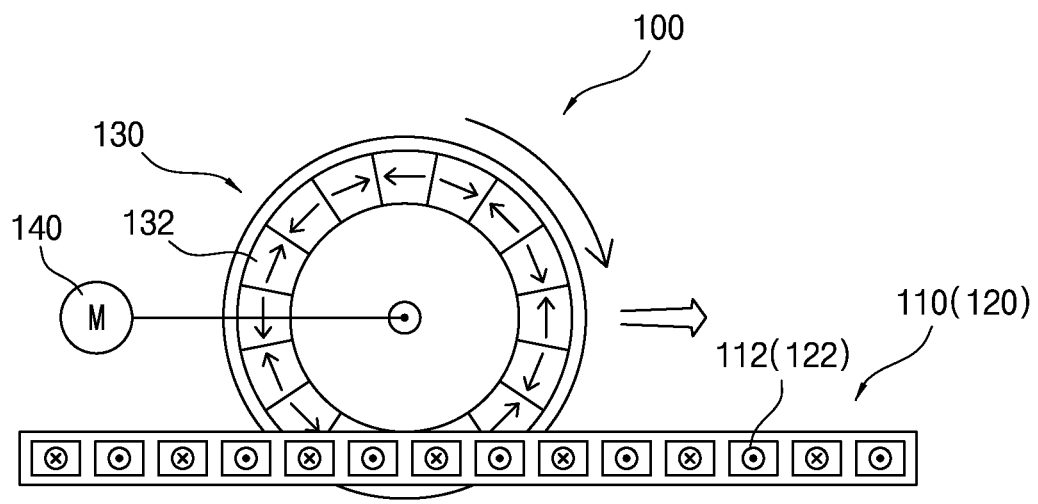
Figure 16:
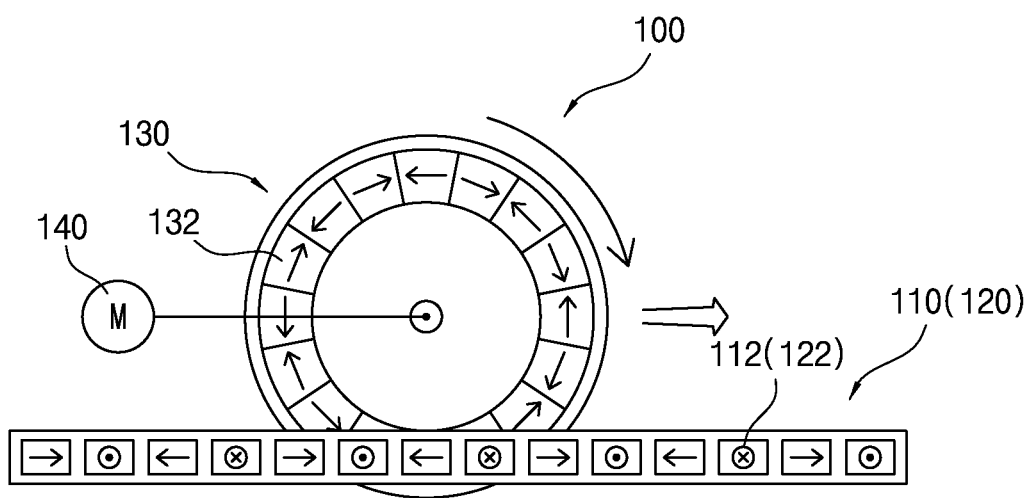

FIGS. 14, 15 and 16 are schematic views illustrating contactless driving modules in accordance with some exemplary embodiments of the present disclosure.

Referring to FIGS. 14 to 16, first and second running rails 110 and 120 may include first and second permanent magnets 112 and 122 arranged in an extending direction, respectively, and a driving wheel 130 may include third permanent magnets 132 arranged in a circumferential direction. Particularly, the third permanent magnets 132 may be disposed such that N poles and S poles are arranged in the circumferential direction and poles of the same polarities face each other in the circumferential direction.

The first and second permanent magnets 112 and 122 may be disposed such that N poles and S poles are arranged in the extending direction as shown in FIG. 14. Particularly, N poles and S poles of the first permanent magnets 112 may be arranged so as to face N poles and S poles of the second permanent magnets 122 in a second direction perpendicular to the extending direction as shown in FIG. 9.

As another example, first and second permanent magnets 112 and 122 may be disposed such that N poles and S poles are arranged in the second direction as shown in FIG. 15. Particularly, N poles and S poles of the first permanent magnets 112 may be arranged so as to face N poles and S poles of the second permanent magnets 122 in the second direction as shown in FIG. 11.

As still another example, first and second permanent magnets 112 and 122 may be arranged in a Halbach arrangement in the extending direction as shown in FIG. 16. Particularly, the first and second permanent magnets 112 and 122 may be disposed such that magnetic poles of the same polarities face each other in the second direction as shown in FIG. 12.

Figure 17:
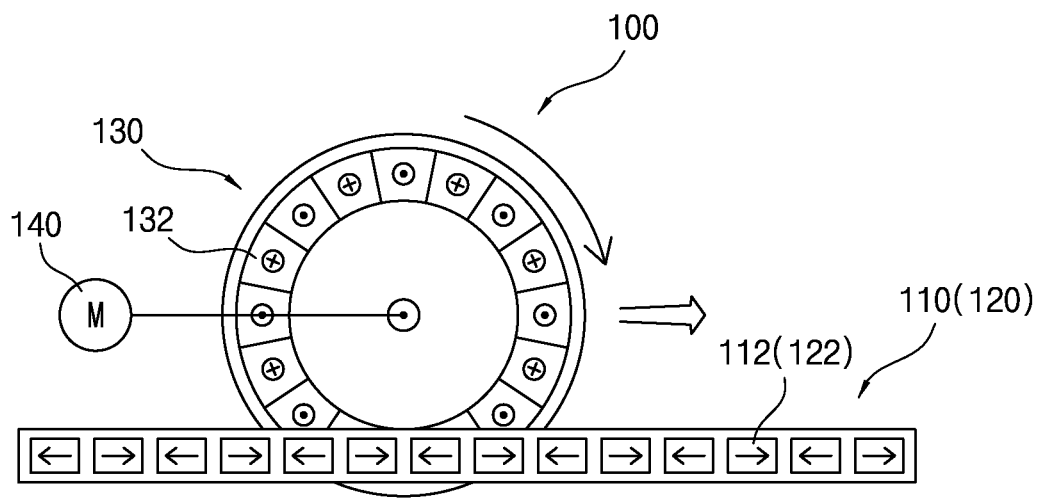
FIGS. 17, 18 and 19 are schematic views illustrating contactless driving modules in accordance with some exemplary embodiments of the present disclosure.
Figure 18:
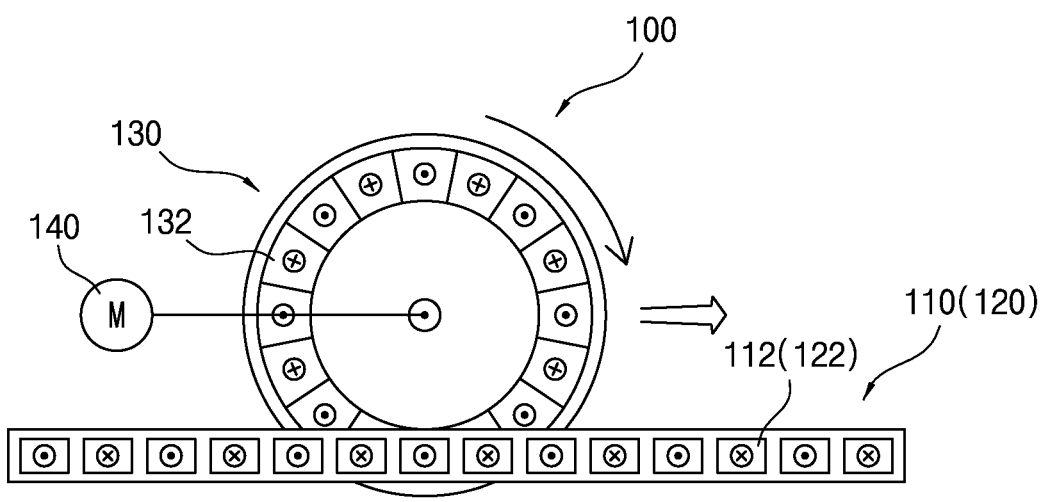
Figure 19:
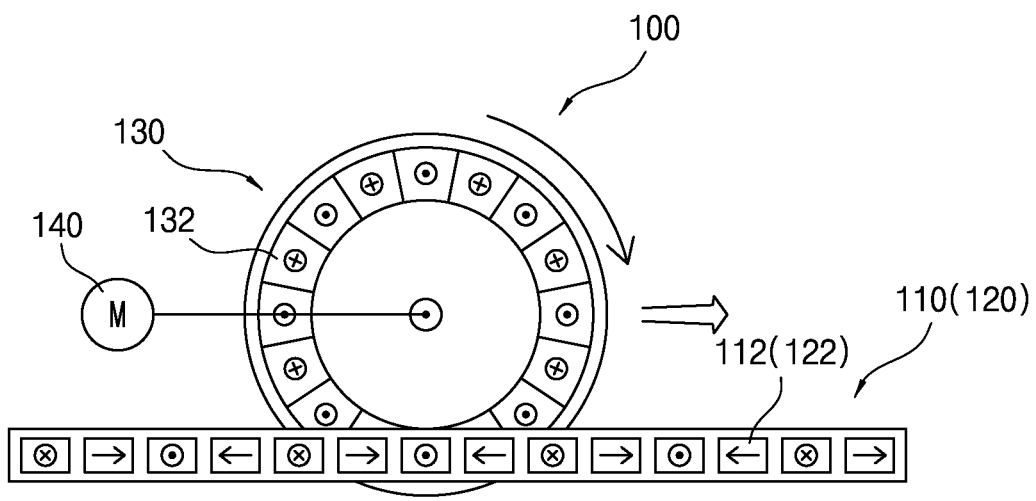

FIGS. 17, 18 and 19 are schematic views illustrating contactless driving modules in accordance with some exemplary embodiments of the present disclosure. Referring to FIGS. 17 to 19, first and second running rails 110 and 120 may include first and second permanent magnets 112 and 122 arranged in an extending direction, respectively, and a driving wheel 130 may include third permanent magnets 132 arranged in a circumferential direction. Particularly, the third permanent magnets 132 may be disposed such that N poles and S poles are arranged in a second direction perpendicular to the extending direction and polarities change in the circumferential direction.

The first and second permanent magnets 112 and 122 may be disposed such that N poles and S poles are arranged in the extending direction as shown in FIG. 17. Particularly, N poles and S poles of the first permanent magnets 112 may be arranged so as to face S poles and N poles of the second permanent magnets 122 in the second direction as shown in FIG. 2.

As another example, first and second permanent magnets 112 and 122 may be disposed such that N poles and S poles are arranged in the second direction as shown in FIG. 18. Particularly, N poles and S poles of the first permanent magnets 112 may be arranged so as to face S poles and N poles of the second permanent magnets 122 in the second direction as shown in FIG. 5.

As still another example, first and second permanent magnets 112 and 122 may be arranged in a Halbach arrangement in the extending direction as shown in FIG. 19. Particularly, polarities of the first and second permanent magnets 112 and 122, which correspond to each other in the second direction, may be arranged in the same directions as shown in FIG. 7.

Figure 20:
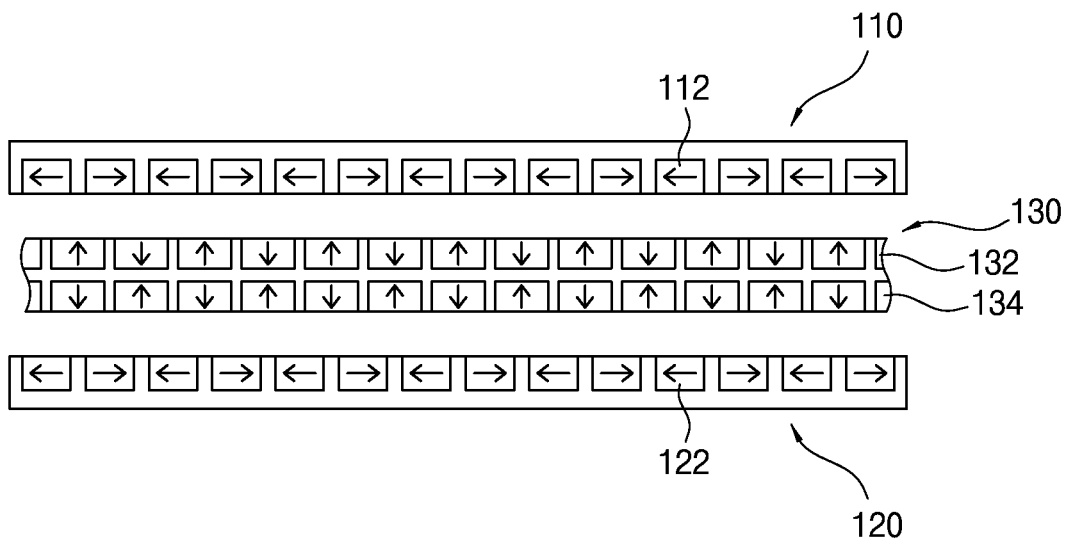
FIG. 20 is a development view illustrating a contactless driving module in accordance with still another exemplary embodiment of the present disclosure.

FIG. 20 is a development view illustrating a contactless driving module in accordance with still another exemplary embodiment of the present disclosure.

Referring to FIG. 20, first and second running rails 110 and 120 may include first and second permanent magnets 112 and 122 arranged in an extending direction, respectively, and a driving wheel 130 may include third and fourth permanent magnets 132 and 134 arranged in a circumferential direction. Particularly, the third and fourth permanent magnets 132 and 134 may be disposed such that N poles and S poles are arranged in a second direction perpendicular to the extending direction and polarities change in the circumferential direction. Further, N poles and S poles of the third permanent magnets 132 may be arranged so as to face N poles and S poles of the fourth permanent magnets 134 in the second direction, respectively.

The first and second permanent magnets 112 and 122 may be disposed such that N poles and S poles are arranged in the extending direction and magnetic poles of the same polarities face each other in the extending direction. Further, N poles and S poles of the first permanent magnets 112 may be arranged so as to face N poles and S poles of the second permanent magnets 122 in the second direction, respectively. Still further, when the third and fourth permanent magnets 132 and 134 are unrolled in the extending direction, N poles and S poles of the third and fourth permanent magnets 132 and 134 may be arranged so as to face S poles and N poles of the first and second permanent magnets 112 and 122, respectively, as shown in FIG. 20.

As another example, though not shown in figures, the first and second permanent magnets 112 and 122 may be disposed such that N poles and S poles are arranged in the second direction. Here, N poles and S poles of the first permanent magnets 112 may be arranged so as to face N poles and S poles of the second permanent magnets 122 in the second direction as shown in FIG. 11.

As still another example, though not shown in figures, the first and second permanent magnets 112 and 122 may be arranged in a Halbach arrangement in the extending direction. Here, the first and second permanent magnets 112 and 122 may be disposed such that magnetic poles of the same polarities face each other in the second direction as shown in FIG. 12.

Figure 21:
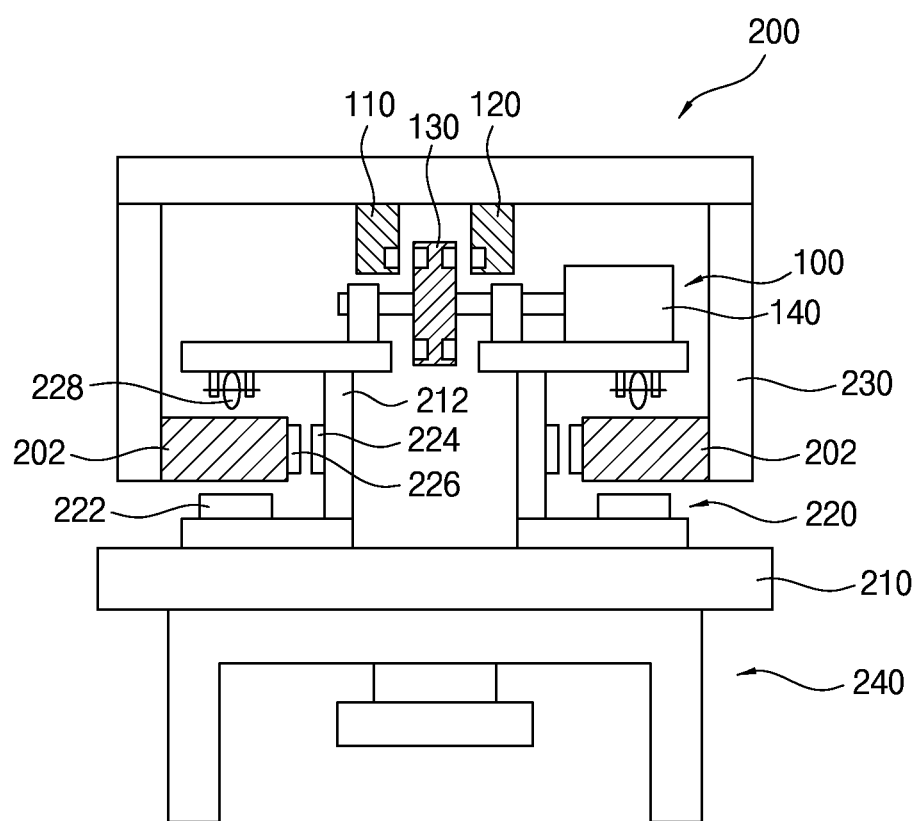
FIGS. 21 and 22 are cross-sectional views illustrating transfer apparatuses in accordance with some exemplary embodiments of the present disclosure.
Figure 22:
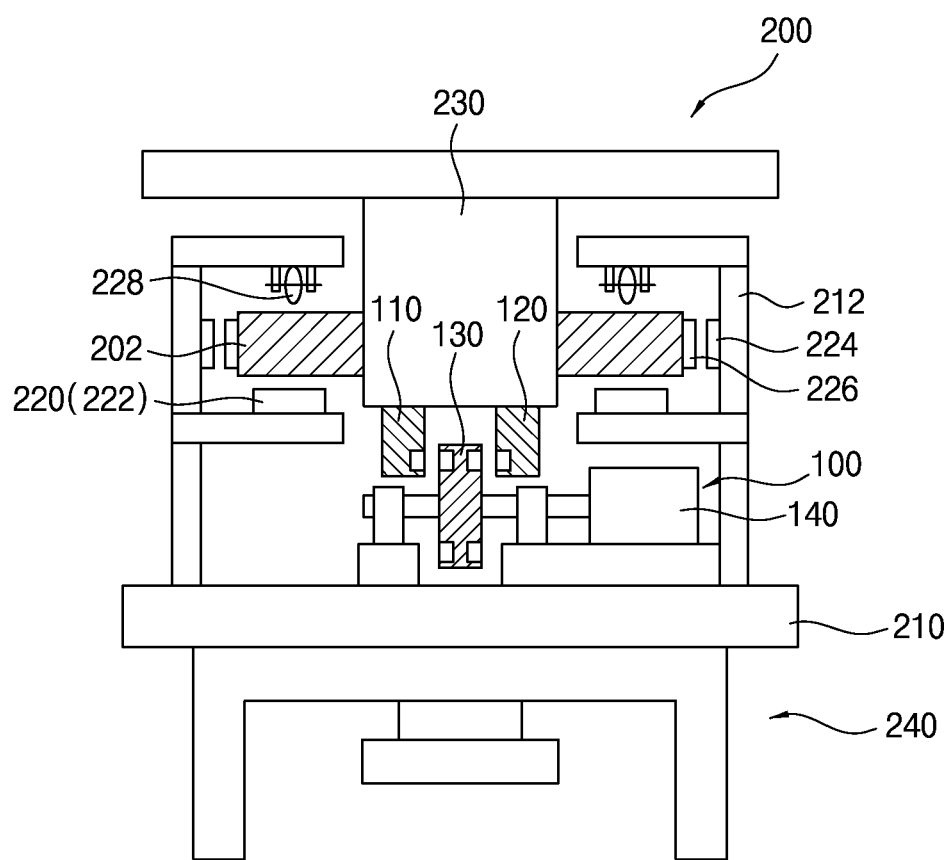

FIGS. 21 and 22 are cross-sectional views illustrating transfer apparatuses in accordance with some exemplary embodiments of the present disclosure.

Referring to FIG. 21, a transfer apparatus 200 including a contactless driving module 100 may be used to transfer articles such as silicon wafers or glass substrates in a semiconductor or display manufacturing process. For example, the transfer apparatus 200 may be used to transport a container such as a FOUP in which semiconductor wafers are received.

The transfer apparatus 200 may include a pair of guide rails 202 extending parallel with each other, a vehicle 210 configured to be movable along the guide rails 202, and a contactless driving module 100 mounted to the vehicle 210. The contactless driving module 100 may include a pair of running rails 110 and 120 extending parallel with the guide rails and including a plurality of first permanent magnets and a plurality of second permanent magnets arranged in an extending direction, respectively, a driving wheel 130 disposed between the running rails 110 and 120 to be spaced apart from the running rails 110 and 120 and including a plurality of third permanent magnets arranged in a circumferential direction, and a driving unit 140 for rotating the driving wheel 130. Particularly, at least a portion of the third permanent magnets is disposed between the first permanent magnets and the second permanent magnets so that the driving wheel 130 is moved along the running rails 110 and 120. For example, the transfer apparatus 200 may include one of the contactless driving modules 100 previously described with reference to FIGS. 1 to 20.

The transfer apparatus 200 may be used as an OHT apparatus. The guide rails 202 and the running rails 110 and 120 may be disposed on the ceiling of the clean room, and the vehicle 210 may be disposed under the guide rails 202. Further, a hoist module 240 for transferring an article such as a FOUP may be mounted on a lower portion of the vehicle 210.

Particularly, the vehicle 210 may be moved in a contactless manner along the guide rails 202. For example, the transfer apparatus 200 may include a magnetic levitation unit 220 for levitating the vehicle 210. The vehicle 210 may include guide frames 212 surrounding the guide rails 202, and the magnetic levitation unit 220 may include magnetic levitation coils 222 mounted to the guide frames 212.

Particularly, as shown in FIG. 21, the guide frames 212 may be configured to surround lower, upper and inner portions of the guide rails 202, and the magnetic levitation coils 222 may be mounted to the guide frames 212 so as to face the lower portions of the guide rails 202. When power is applied to the magnetic levitation coils 222, the vehicle 210 may be levitated by attractive forces generated by the magnetic levitation coils 222.

Further, first and second guide magnets 224 and 226 which generate a repulsive force therebetween may be disposed on the side surfaces of the guide frames 212 and the guide rails 202 facing each other, respectively. Controllable electromagnets may be used as one of the first and second guide magnets 224 and 226, and permanent magnets may be used as the remaining one of the first and second guide magnets 224 and 226. The first and second guide magnets 224 and 226 may be used to prevent friction between the guide rails 202 and the guide frames 212 and to reduce vibration and noise during the movement of the vehicle 210.

Still further, auxiliary wheels 228 may be disposed between the guide frames 212 and the guide rails 202. For example, the auxiliary wheels 228 may be mounted to upper portions of the guide frames 212 so as to face the upper portions of the guide rails 202. When power is not applied to the magnetic levitation coils 222, the auxiliary wheels 228 may support the vehicle 210 and enable movement of the vehicle 210.

The transfer apparatus 200 may include a support rail 230 for supporting the guide rails 202 and the running rails 110 and 120. For example, the running rails 110 and 120 may be disposed over the guide frames 212, and the driving wheel 130 and the driving unit 140 may be disposed on the guide frames 212 as shown in FIG. 21.

Alternatively, as shown in FIG. 22, guide frames 212 may be configured to surround upper, lower and outer portions of guide rails 202, and a support rail 230 may be disposed between the guide frames 212. The guide rails 202 may be disposed on both sides of the support rail 230, and running rails 110 and 120 may be disposed on a lower portion of the support rail 230. Further, a vehicle 210 may be disposed under the guide rails 202, and a driving wheel 130 and a driving unit 140 of a contactless driving module 100 may be disposed on the vehicle 210.

The vehicle 210 may be levitated by the magnetic levitation unit 220 and may be moved by the contactless driving module 100. Thus, particles generated during movement of the transfer apparatus 200 may be significantly reduced in comparison with the conventional transfer apparatus using frictional force between running wheels and rails.

Alternatively, though not shown in figures, the vehicle 210 may include running wheels (not shown) disposed on the upper portions of the guide rails 202 instead of the magnetic levitation unit 220. Further, the vehicle 210 may include guide wheels (not shown) disposed on side portions of the guide rails 202 instead of the first and second guide magnets 224 and 226. The running wheels may movably support the vehicle 210, and the guide wheels may be used to guide the vehicle 210 along the guide rails 202.

Figure 23:
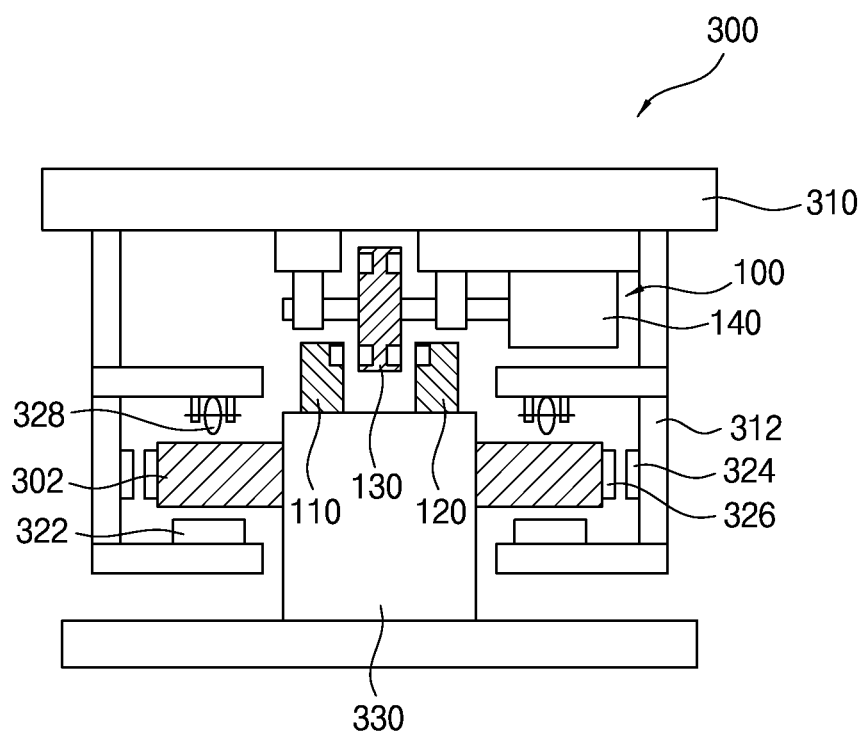
FIG. 23 is a cross-sectional view illustrating a transfer apparatus in accordance with still another exemplary embodiment of the present disclosure.

FIG. 23 is a cross-sectional view illustrating a transfer apparatus in accordance with still another exemplary embodiment of the present disclosure.

Referring to FIG. 23, a transfer apparatus 300 including a contactless driving module 100 may be used as a RGV apparatus. The transfer apparatus 300 may include a pair of guide rails 302, a vehicle 310 configured to be movable along the guide rails 302, and a contactless driving module 100 for moving the vehicle 310.

The vehicle 310 may be disposed over the guide rails 302 and may include guide frames 312 surrounding the guide rails 302. The contactless driving module 100 may include running rails 110 and 120 extending parallel with the guide rails 302, a driving wheel 130 disposed between the running rails 110 and 120, and a driving unit 140 for rotating the driving wheel 130. For example, the transfer apparatus 300 may include one of the contactless driving modules 100 previously described with reference to FIGS. 1 to 20.

The guide rails 302 may be disposed on both sides of a support rail 330, and the running rails 110 and 120 may be disposed on an upper portion of the support rail 330. The driving wheel 130 and the driving unit 140 may be disposed on a lower portion of the vehicle 310, and the driving wheel 130 may be disposed to be spaced apart from the running rails 110 and 120.

The transfer apparatus 300 may include magnetic levitation coils 322 mounted to the guide frames 312 so as to face lower portions of the guide rails 302, auxiliary wheels 328 mounted to the guide frames 312 so as to face upper portions of the guide rails 302, and first and second guide magnets 324 and 326 disposed on side surfaces of the guide frames 312 and the guide rails 302 facing each other, respectively.

In accordance with the exemplary embodiments of the present disclosure as described above, the contactless driving module 100 may generate propulsive force by rotating the driving wheel 130 between the first and second running rails 110 and 120. Particularly, the driving wheel 130 may be disposed to be spaced apart from the first and second running rails 110 and 120, and the propulsive force may be generated by magnetic force between the first and second permanent magnets 112 and 122 and the third permanent magnets 132. Further, the transfer apparatus 200 may levitate the vehicle 210 from the guide rails 202 using the magnetic levitation coils 222 and may move the vehicle 210 using the contactless driving module 100.

Thus, the generation of particles during the operation of the transfer apparatus 200 may be significantly reduced in comparison with the conventional transfer apparatus. Further, vibration and noise during the operation of the transfer apparatus 200 may be significantly reduced.

Although the contactless driving module and the transfer apparatus having the same have been described with reference to specific embodiments, they are not limited thereto. Therefore, it will be readily understood by those skilled in the art that various modifications and changes can be made thereto without departing from the spirit and scope of the present disclosure defined by the appended claims.

The invention claimed is:

1. A contactless driving module comprising:
a pair of running rails extending parallel with each other and comprising a first running rail comprising a plurality of first permanent magnets arranged in an extending direction and a second running rail comprising a plurality of second permanent magnets arranged in the extending direction;
a driving wheel disposed between the running rails to be spaced apart from the running rails and comprising a plurality of third permanent magnets arranged in a circumferential direction; and
a driving unit for rotating the driving wheel, wherein
at least one of the third permanent magnets is disposed between the first permanent magnets and the second permanent magnets, and
propulsive force in the extending direction is generated by magnetic force between the first permanent magnets and the third permanent magnets and between the second permanent magnets and the third permanent in magnets.

2. The contactless driving module of claim 1, wherein the first and second permanent magnets are disposed such that N poles and S poles are arranged in the extending direction and poles of the same polarities face each other in the extending direction.

3. The contactless driving module of claim 1, wherein the first and second permanent magnets are disposed such that N poles and S poles are arranged in a second direction perpendicular to the extending direction and polarities change in the extending direction.

4. The contactless driving module of claim 1, wherein the first and second permanent magnets are arranged in a Halbach arrangement.

5. The contactless driving module of claim 1, wherein N poles and S poles of the first permanent magnets are arranged so as to face N poles and S poles of the second permanent magnets in a second direction perpendicular to the extending direction, respectively.

6. The contactless driving module of claim 1, wherein N poles and S poles of the first permanent magnets are arranged so as to face S poles and N poles of the second permanent magnets in a second direction perpendicular to the extending direction, respectively.

7. The contactless driving module of claim 1, wherein the third permanent magnets are arranged in a Halbach arrangement.

8. The contactless driving module of claim 7, wherein the driving wheel further comprises a plurality of fourth permanent magnets circumferentially arranged in a Halbach arrangement, and
the third and fourth permanent magnets are disposed on both sides of the driving wheel so as to face the first and second permanent magnets, respectively.

9. The contactless driving module of claim 1, wherein the third permanent magnets are disposed such that N poles and S poles are arranged in the circumferential direction and poles of the same polarities face each other in the circumferential direction.

10. The contactless driving module of claim 1, wherein the third permanent magnets are disposed such that N poles and S poles are arranged in a second direction perpendicular to the extending direction and polarities change in the circumferential direction.

11. The contactless driving module of claim 10, wherein the driving wheel further comprises a plurality of fourth permanent magnets arranged in the circumferential direction,
the fourth permanent magnets are disposed such that N poles and S poles are arranged in the second direction and polarities change in the circumferential direction, and
the third and fourth permanent magnets are disposed on both sides of the driving wheel so as to face the first and second permanent magnets, respectively.

12. The contactless driving module of claim 1, wherein a pitch of the first and second permanent magnets in the extending direction is the same as a pitch of the third permanent magnets in the circumferential direction.

* * * * *